Jan. 8, 1957   P. L. WATERS   2,777,060
ELECTRONIC INFORMATION STORAGE SYSTEMS
AND DISCHARGE TUBES THEREFOR
Filed July 2, 1951

Inventor
Paul L. Waters
By
Stevens Davis Miller + Mosher
Attorneys

United States Patent Office 2,777,060
Patented Jan. 8, 1957

2,777,060

ELECTRONIC INFORMATION STORAGE SYSTEMS AND DISCHARGE TUBES THEREFOR

Paul L. Waters, Malvern, England, assignor to National Research Development Corporation, London, England, a British corporation Application July 2, 1951, Serial No. 234,811

Claims priority, application Great Britain July 7, 1950

7 Claims. (Cl. 250—27)

The present invention relates to electronic information storage systems such as are used for example in electronic computing apparatus, and to cathode ray discharge tubes for use therein.

It is known to store information, which may be in the form of digit elements or of a pictorial nature, by impressing on a target or screen in a cathode ray tube a pattern of electric charge which may be laid down on the storage surface by bombardment with the cathode ray beam.

Such apparatus is known in which, by bombardment of the storage surface with a cathode ray beam scanned over the surface in an appropriate regime and operating at an appropriate electron velocity, the desired charge pattern may be laid down on the surface and in subsequent scanning cycles, signals representing the information represented by the charge pattern may be generated in an external circuit, the charge pattern may be erased, altered or regenerated simultaneously, or the charge pattern may simply be regenerated. In such systems the charge pattern may be built-up on the surface by causing the incident electron beam to strike secondary electrons from the storage surface, the state of charge of the surface at any given point depending upon the number of such secondary electrons emitted in relation to the number of primary electrons reaching the surface.

In some such systems the charge pattern is laid down upon an insulating surface which may be, for example, the normal cathode ray tube phosphor screen or may be a target, for example of metal-backed mica or of aluminum anodised upon its surface, and the stability with which any given pattern laid down on the surface can be maintained depends upon the insulating properties of the surface. Whatever the quality of the insulator, however, leakage of the charge tends to take place and sets an ultimate limit to the time for which any given pattern can be retained. Expedients for the regeneration of the charge pattern are known, but suffer from the disadvantage that, unless special precautions are taken the charge pattern tends to lose definition and can drift bodily.

The present invention is directed towards the problem of overcoming this last named difficulty and has for one of its objects to provide a cathode ray tube storage system in which a charge pattern may be set up and retained for an indefinite period without loss of definition or drift.

This object is achieved according to the invention by providing a cathode ray tube storage system for the storage of information by reference to a charge pattern laid down upon a storage surface, comprising a cathode ray tube including a storage surface in the form of a mosaic of insulating elements supported on a conductive carrier with each of said elements separated from its neighbors by exposed regions of said conductive carrier, one or more electron guns adapted to direct an electron stream or electron streams towards said storage surface on the side thereof carrying said insulating elements and means for operating said electron gun or guns selectively to provide an electron stream or electron streams having an effective electron velocity (a) which is above the first secondary emission crossover point for all parts of the storage surface for the purpose of setting said storage surface into a state of positive charge (b) which is above the first secondary emission cross-over point for positively charged regions of said storage surface and below the cross-over point for negatively charged regions of said storage surface for the purpose of maintaining and reading out information represented by a given pattern of charge on said storage surface and (c) which is below the cross-over point for positively charged regions of said storage surface for the purpose of converting positively charged regions of said surface to negatively charged regions.

The invention will be more clearly understood from the following description given with reference to the accompanying drawings in which.

Consider a target of the above defined type mounted in a cathode ray tube which includes also a cathode, and a collector electrode or final anode, let the target be maintained at earth potential, the collector electrode at a few volts, say 10 volts positive to the target, and let the cathode be caused to fire electrons at the screen or target. As the potential of the cathode is lowered, below earth potential, the velocity with which the electrons strike the target will increase as the potential difference between cathode and target increases. As this velocity increases the ratio of secondary electrons emitted from the target to primary electrons reaching the target increases.

Figure 1:
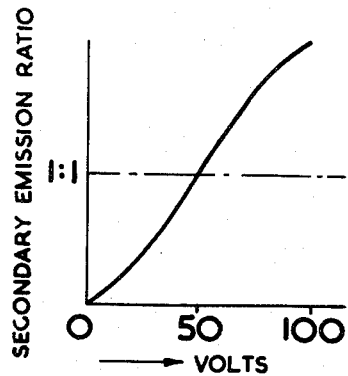
Figs. 1 and 2 are explanatory diagrams.

Fig. 1 of the drawings is a curve showing how this varies with the velocity of the electrons measured in terms of the effective voltage between the cathode and the target. It will be seen that this ratio passes through the value 1:1 at an electron velocity of approximately 50 volts. This is termed the "cross-over point." This curve applies to both the insulating and the conductive parts of the target surface. It follows that if the target is bombarded at an electron velocity below the cross-over point, the insulating portions of the surface of the target will tend to acquire a negative charge and assume a voltage in the neighbourhood of the cathode voltage. If on the other hand the electron velocity is raised above this value the insulating portions of the target surface will tend to lose by secondary emission more electrons than are collected by primary electron bombardment so that they will tend to acquire a positive charge and will tend towards a voltage in the neighbourhood of the voltage of the collector electrode, it being assumed that the secondary electrons emitted are substantially all drawn off by the collector electrode.

If now the current flowing to or form the metal backing plate due to the electron bombardment is considered, the action of the charged insulating portions being ignored, it will be apparent that, for electron velocities below the cross-over point, a conventional current due to primary electrons entering the plate will flow from earth to the plate. This will be termed hereinafter a "negative" current. For electron velocities above the cross-over point the current will be in the reverse sense (hereinafter termed "positive") since more secondary electrons are lost than there are primary electrons arriving.

Now it will be apparent that the current actually flowing to or from the metal plate will be affected not only by the potential difference between the cathode and the plate but also by the charge potential set up on the insulating elements on the surface of the plate. The precise nature of the effect of these charge potentials is a matter for conjecture but it is believed that the effect may, in appropriate circumstances, resemble that of a "suppressor" grid in a pentode valve. Thus it is thought that, if the insulating elements are negatively charged the field thus set up will tend to trap secondary electrons struck out from the metal plate, preventing their escape to the collector electrode so that they fall back into the metal plate and thus the region of cathode/target potential differences over which a "negative" current to the plate is obtained will be increased. If, on the other hand, the insulating elements are positively charged they will tend to assist the liberation of the secondary electrons from the metal plate thus helping to maintain a "positive" current to the plate. At all events, with a target made as above described by coating a metal plate thinly with phosphor so that the target surface was composed of about 50% insulator and 50% metal, and having a secondary emission characteristic as illustrated in Fig. 1, the conventional current to the metal plate was plotted against effective cathode/plate voltage and a curve obtained of the form shown in Fig. 2, in which "negative" current is plotted downwardly and "positive" current upwardly.

From Fig. 2 (full line curve) it will be seen that as the cathode potential was lowered the current to the target plate increased in the negative direction levelled off, and, instead of reversing in sign as the cross-over point (in this case about 50 volts) was passed, persisted beyond the cross-over point, subsequently falling off and reversing at about 100 volts, thereafter building up as positive current. As the cathode voltage was raised the "positive" current did not fall appreciably (dotted line curve) until a voltage in the neighbourhood of the cross-over point was reached, whereupon the "positive" current gave place rapidly to a negative current at the maximum value which had been reached in the forward excursion of the curve.

Figure 2:
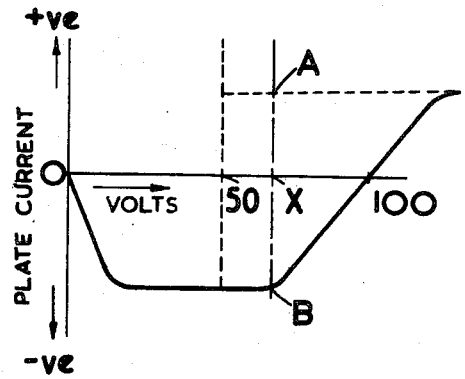

These observed facts support the above theory and demonstrate that for a cathode ray tube arranged as described above and operating at a cathode/target potential difference slightly above the cross-over point in the secondary emission characteristic, e. g. at the value marked X in Fig. 2 (of the order of 60 volts in this example), two stable values of target current can be set up according to the state of charge of the surfaces of the insulating elements or particles of the target. These are firstly a negative current, if the elements are negatively charged and secondly a positive current if the elements or particles are positively charged. It will be appreciated that the respective conditions under which these two values of target current are set-up will be stable, for the following reasons. If the insulating elements are positively charged there can be no tendency for them to aspire to a voltage higher than that of the collector electrode. On the other hand if due to leakage there is a tendency for these elements to drop their voltage, continued electron bombardment at the appropriate electron velocity will regenerate the positive charge. Alternatively if the elements are negatively charged there will be no tendency for them to aspire to any potential lower than the cathode potential while if due to leakage of the charge there is a tendency for their potential to rise, electron bombardment will again regenerate the charge. Whichever of the conditions obtains the electron velocity at which the insulating elements are struck by the bombarding electrons will be of the right order to build-up a positive charge by striking out secondary electrons in one case or build-up the negative charge by collection of primary electrons in the other case. To see that this is so, first assume that the insulating elements are positively charged. With the target at earth potential and the collector electrode at, say +10 volts, this means that the insulating elements will be at substantially +10 volts. The cathode is at −60 volts so that the cathode/target potential difference will be of the order of 70 volts, i. e. above the cross-over value. It follows that the excess of secondary emission over primary bombardment at the corresponding electron velocity will maintain the positive charge.

Now assume that the elements are negatively charged, which means that they will be at substantially cathode potential. The velocity with which electrons will encounter the elements, therefore, will be well below the cross-over point, secondary emission will be negligible and arriving electrons will clearly offset any tendency for the negative charge to leak away.

It is now necessary to show how a charge pattern may be laid down on the target. To do this, let us start with all the insulating elements positively charged. This condition can be achieved by bombarding the whole target with electrons at a velocity well above the secondary emission characteristic cross-over point. Thereafter the condition may be maintained as above described by bombarding the target continually at the electron velocity in the neighbourhood of value X indicated in Fig. 2 and above referred to. A positive current to the target plate will meanwhile be maintained. Assume now that a second electron gun is provided in the cathode ray tube and that this gun may have its cathode operating at any one of three potentials with respect to earth, namely say, −30 volts, −60 volts (the value X) and −120 volts. With the cathode of this second electron gun operating at −30 volts it will be apparent that the effective electron velocity between this cathode and the positively charged insulating elements will be equivalent to say, 40 volts, that is to say a velocity below the secondary emission cross-over point. This, as above described, will have the effect of removing the positive charge on the area bombarded and replacing it by a negative charge. Once this has happened the continued bombardment of the area by the original electron gun (at −60 volts) will reduce the voltage on this area to substantially the voltage of the original gun cathode, i. e. −60 volts and this condition will be maintained so long as the bombardment continues. Assuming that this process was carried out on a restricted area of the target, the negative charge set up on the insulating particle of this area cannot leak to other parts of the surface since particles in the area are isolated by a metallic region from neighbouring insulating elements and no potential difference can be set up across this metallic region to affect the charge potential of neighbouring insulating elements. If therefore, the second electron gun is arranged to produce a focussed beam which may be scanned over the target surface it may be made, by suitable scanning regime and suitable modulation to convert any selected areas to a state of negative charge on the insulating particles from their initial state of positive charge assumed above.

In order now to "read off" from the target signals indicative of the charge pattern thus set up, the target may be scanned by a focussed beam from the second electron gun, operating now at the same electron velocity as that of the original gun, i. e. at a cathode potential of −60 volts. When this beam falls upon areas of the target which are still positively charged (say at +10 volts), the effective electron velocity at the target will be 70 volts, i. e. above the cross-over point so that the current to the target plate thereby set up will be positive (corresponding to the position A marked on the curve of Fig. 2). When, however, a region of negative charge is encountered the effective electron velocity will be well below the cross-over point so that the current to the target plate thereby set up will be negative (corresponding to the position B on the curve of Fig. 2). As the beam is traversed over the area therefore, there will be experienced a change in the current to the target plate in one sense or the other for each transition from a positively charged area to a negatively charged area or vice versa. These current changes may be converted to voltage changes, picked off and amplified so as to be used as signals in known manner. Since, however, the effective electron velocities for the negatively and positively charged parts of the target plate are below and above the secondary emission cross-over point, respectively the "reading" operation will not affect the charge pattern on the target plate, which will be maintained by this bombardment in the same way as it is maintained by the bombardment from the first electron gun operating at the same cathode potential.

Figure 3:
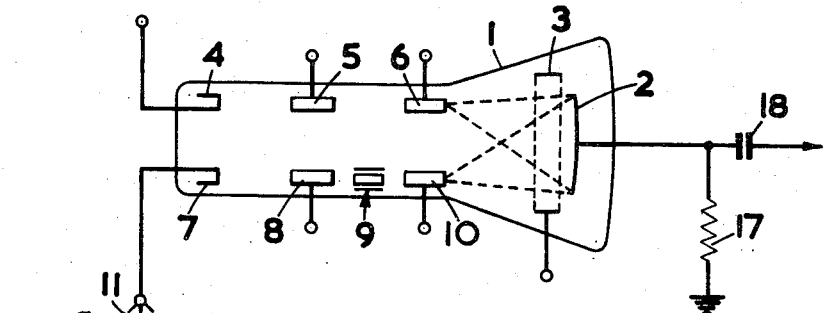
Fig. 3 is a diagrammatic representation of a cathode ray tube embodying the invention.

In order to erase a charge pattern thus laid down it is necessary to convert the negatively charged regions back to positively charged regions. This can be done by irradiating the appropriate parts of the surface with electrons at high velocity, that is to say, with the second electron gun cathode at the lowest (greatest negative) voltage above mentioned, namely, −120 volts. The negatively charged regions will be at a voltage in the neighbourhood of the cathode voltage of the original gun, that is to say −60 volts. With the second gun cathode at −120 volts therefore the effective electron velocity at the negatively charged areas of the surface will be 60 volts. This is above the cross-over point in the secondary emission characteristic so that the area in question will be driven to take up a positive charge, with the voltage at the surface in the neighbourhood of the collector electrode voltage. This condition will then be maintained by the original gun operating at a relative cathode potential of −60 volts. During the erasure of a negative charge region, the conventional current to the target plate will be positive. That is to say during the erasure of a charge pattern from the target, signals representing the charge pattern may be derived from the changes in target current in the same way as above described for operation in the "reading" regime with the difference that when erasure is taking place the signals will be in the reverse sense. In Fig. 3 of the drawings such a system is illustrated diagrammatically. This figure shows a cathode ray tube 1 having a target 2 which is of the kind to which this invention relates, surrounding which is an annular final anode or collector electrode 3. This collector electrode could of course be provided in the form of a wall layer on the appropriate region of the cathode ray tube envelope.

Two electron gun systems are provided in the tube; one comprises a cathode 4, an accelerating and directing electrode system 5 and a decelerating electrode system 6. This gun is designed to irradiate the whole surface of the target 2 simultaneously, and continuously, with electrons the velocity of which corresponds to a cathode voltage in the region of value X referred to in the above theoretical discussion. The second system comprises a cathode 7 accelerating and focussing electrodes indicated diagrammatically at 8, deflection electrodes 9 and retarding electrode system 10. This second system of electrodes is intended to provide a focussed beam of electrons which may be scanned over the surface of target 2 by means of deflector electrodes 9 and the velocity of which may be varied between the three values required for "writing" a charge pattern into the system, "reading" a charge pattern laid down or "erasing" a charge pattern. Selection of the appropriate regime may be effected by means of switch 11 which in its left-hand position (position a) connects the cathode 7 to an appropriate voltage source for the "reading" regime (terminal 12), in its centre position (position b) connects the cathode to an appropriate voltage source for the "write" regime (terminal 13) and in its right-hand position the "erase" regime (terminal 14). The lead down to terminal 13 includes a modulator switch 15 to which signals are applied through terminal 16, to enable the appropriate charge controlling signals to be "written in" to the storage system.

Target 2 is connected through a resistor 17 to earth and through a condenser 18 to a signal amplifier (not shown). With the electron gun constituted by cathode 4 and electrode systems 5 and 6 continuously operating the charge conditions set up on target 2 will be maintained indefinitely. Now with the switch 11 in position a signals corresponding to the charge pattern set up on target 2 will be supplied to the signal amplifier connected to condenser 18 in the sequence determined by the scanning regime applied by deflector electrodes 9 to the electron beam issuing from cathode 7. This "reading" operation will not disturb the charge pattern on target 2. With switch 11 in position b the beam from cathode 7 will "write" new information into the charge pattern on target 2 in accordance with the modulation applied to cathode 7 by modulator 15 and in accordance with the scanning regime employed. With switch 11 in position c the beam from cathode 7 will "erase" any part of the charge pattern towards which the beam is directed by the deflector electrodes. It will now be apparent that the storage system illustrated may form part of an apparatus such as an electronic digital computer. In such a case the charge pattern laid down on the target will represent, for example, a series of lines or columns of digit indications, a line of such digit indications indicating a number by the well-known system of binary coding according to which each digit is a 1 or a 0, indicating according to its position in the line the presence or absence of the corresponding power of "2." Such a line of digits may be written into the store by placing switch 11 in position b, scanning the beam from cathode 7 along the line and releasing, by means of the control effected by modulator 15, the electron beam at the appropriate instants to impress a "1" indication on the target as a region of negative charge. By extending the scanning regime into a raster the desired number of such lines may be built up. Obviously by discontinuous scanning or by the appropriate modulation of the beam in any given scanning regime signals may be read out of the store from any selected part thereof and may be erased from any part thereof, such expedients being well known to those skilled in the art.

It has been stated above that the signals passed out through condenser 18 when the switch 11 is in position c (the "erase" position) are opposite in sign to those given out when the switch is in position a (the "read" position). It may of course be arranged that in order to avoid false interpretation of these signals, operation of the switch 11 may introduce an additional inverting stage into the amplifier which follows this output. Similarly it will be understood that switch 11 may be of an electronic nature so that the operation of the tube may be switched rapidly from one function to another as may be desired within any given computing system of which the storage tube according to the invention may form a part.

It has also been stated above that the electron gun constituted by cathode 4 and electrode systems 5 and 6 sprays the whole of target 2 simultaneously. It is also possible of course, instead, to use a focussed beam in this situation continuously scanned over the whole of the target in a raster regime.

Although the application of this system to information storage in electronic digital computers it is obviously equally possible for the system to be used for storage of information represented in a pictorial or diagrammatic way, subject of course to the limitation that only "black and white" representations can be stored. Thus the negatively charged areas will all tend to be at the same potential and all the positively charged areas will be at the same potential and there can be no intermediate states of charge to provide "grey" tones, although it may be possible to achieve some measure of intermediate tone values by controlling the sizes of elemental areas making up a pictorial representation in a manner analogous to that used in the so-called half tone printing process.

The above description contemplates a cathode ray tube having two electron guns, one of which is used for "holding" the charge pattern, the other being used at a variety of effective cathode potentials for "reading," "writing"

and "erasing" the charge pattern. It will be appreciated, of course, that these latter functions may be assigned severally to separate electron guns provided in the tube. Alternatively, by appropriate modulation of the effective cathode potential and by the use of an appropriate interlaced scanning regime a single electron gun could be employed for all four functions, the proportion of time allotted to operation of the gun in the "holding" function being made adequate to preserve the charge pattern as may be found necessary.

In the above discussion reference has been made to the "effective" cathode/target voltage and in the tube illustrated in Fig. 3 accelerating and decelerating electrode systems have been shown. It will be appreciated by those skilled in the art that in order to achieve suitable focussing or direction of an electron beam and especially to enable deflection to be effected readily for scanning purposes it is necessary to employ electron beams at considerably higher velocities than are represented by the cathode/target voltages mentioned. As a matter of practical technique therefore it will normally be preferred to employ some such arrangement as that which has been described with reference to Fig. 3 in which electrons emitted from a cathode are first accelerated so that at the increased speed thus obtained the electrons may be focussed into a beam which is capable of being scanned over a surface, further decelerating electrodes being provided adapted to reduce the velocity of the beam, after it has been suitably directed, to a suitable velocity for the secondary emission phenomena discussed to be employed in the desired manner. The effective cathode/target voltage, therefore, will be the voltage appropriate to the final velocity to which the electrons are conditioned and with which they in fact reach the target.

Figure 4:
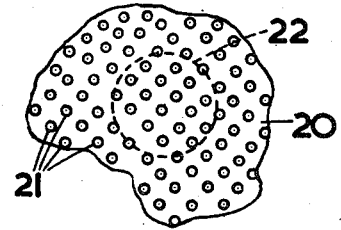
Fig. 4 is a magnified illustration of a part of the screen or target of the cathode ray tube of Fig. 3.

It only remains to discuss in some detail the various forms which the target 2 may take. As has been pointed out above the target or screen according to the invention is required to consist of insulating elements or particles distributed over a conductive surface in spaced relationship so that any element or particle upon which a charge is developed cannot convey this charge to adjacent areas of the surface, the conductive (normally metallic) surface separating the insulating areas being an effective barrier to any creepage of charge from one element to another. It will also appear that the ratio of insulating surface to exposed metallic surface which the target presents will affect the operation of the target and influence the shape of the current/voltage curve of Fig. 2. It has been found, as above stated, that by depositing a normal cathode ray tube screen phosphor on a metallic plate so thinly that the metallic surface is approximately 50% covered, satisfactory operation can be achieved. Such a screen consists of a very large number of very small insulating particles distributed over the metal surface and it is preferable for a screen of this kind to ensure that the particle size is small in relation to the cathode ray spot size. In Fig. 4 a fragment of the target is illustrated in much magnified form. Metallic base plate 20 will be seen to carry a large number of insulating elements consisting of particles of insulating material 21 distributed over its surface. The dotted circle 22 illustrates the relative size of the cathode ray spot which may be used on such a surface and it will be seen to embrace about 16 to 20 particles.

One alternative method of preparing such a target is to form an insulating layer on the surface of an aluminum plate by anodising in well-known manner and then subdividing the insulating surface by engraving through it to expose the metal, a fine tracery or grid of lines so spaced in relation to their width that an appropriate relationship between the exposed metal and the remaining insulating surface is obtained. An alternative method is to apply phosphor to the surface of a metal plate by depositing it through a fine mesh screen so that the deposit is divided into isolated elemental areas separated by bare metal. Yet another method may be to spray suitable insulating material on to a metal plate the insulator being atomised by the spray and controlled in quantity so that it falls upon the surface in small separate droplets. It will be appreciated that in either of these last two suggested methods any tendency for adjacent insulating elements to coalesce should be avoided as far as possible since two insulating particles which in fact meet at any point are for the purpose of charge storage equivalent to a single particle.

So far, in discussing the target, it has been assumed that a very small grain or element size will be used for the insulating elements on the targets. This is not necessarily required. Each element might, for example, exceed in size the cathode ray spot and constitute by itself one charge receiving area for the purpose of storing one element of information. The cathode ray beam would then require to be scanned and modulated so as to fall within the boundaries of the appropriate one of such elements at the appropriate time. In preparing such a screen, however, it would still have to be borne in mind that the ratio of insulating area to exposed metallic area must be appropriate for the desired secondary emission effects to take place.

Finally in the above description reference has been made to the secondary emission characteristics of materials and "the cross-over-point" has been referred to. It should be pointed out that the secondary emission characteristic, when extended to higher electron velocities than those which have been considered in this specification, dips again below the 1:1 level at what is known as the "second cross-over point." It will be understood of course that only the first cross-over point is contemplated in this specification.

I claim:

1. A cathode ray tube storage system for storage of information by reference to a charge pattern laid down on a cathode ray tube target, comprising a cathode ray tube having a target in the form of a conductive plate bearing on one surface a mosaic of discrete insulating elements each isolated from its neighbours by an exposed region of said conductive plate, a collector electrode positioned adjacent said target electrode and two electron guns both positioned to direct electrons towards said target electrode, a source of operating voltages, a source of modulating voltages, connections between said source of operating voltages and the first of said electron guns to cause said gun to direct electrons to said target electrode at an effective electron velocity above or below the secondary emission cross-over point depending upon the state of charge of the part of said target electrode encountered by the electrons, switch means connected between an electrode of said second electron gun said source of operating voltages and said source of modulating voltages to permit the supply to said second electron gum of (a) a voltage from said source of modulating voltages modulated to provide an effective electron velocity below the first secondary emission cross-over point for positively charged regions of the target electrode, alternating with an effective electron velocity above or below the first secondary emission cross-over point depending upon the state of charge of the part of the target electrode encountered by the modulated electron beam, (b) a voltage corresponding to an effective electron velocity which is above the first secondary emission cross-over point for positively charged regions of the target electrode and below the first secondary emission crossover point for negatively charged regions of the target electrode (c) and a voltage corresponding to an effective electron velocity above the secondary emission cross-over point for all parts of the target electrode, and an output circuit connected to said target electrode.

2. A cathode ray tube storage system as claimed in claim 1 in which the first electron gun provides electron bombardment diffusely over substantially the whole of the target electrode while the second electron gun provides a focussed beam and means are provided for scanning said beam over the target electrode.

3. A cathode ray tube storage system for storage of information by reference to a charge pattern laid down on a cathode ray tube target electrode comprising a cathode ray tube having a target in the form of a conductive plate bearing on one surface a mosaic of discrete insulating elements each isolated from its neighbors by an exposed region of said conductive plate, a collector electrode positioned adjacent said target electrode and at least one electron gun positioned to direct electrons towards said target electrode, a source of operating voltages, connections between said source of operating voltages and the electron gun and means for switching said connections to cause the electrons to be directed towards said target electrode at an effective electron velocity ($a$) which is above the first secondary emission cross-over point for all parts of the target surface for the purpose of setting said target surface into a state of positive charge, ($b$) which is above the first secondary emission cross-over point for positively charged regions of said target surface and below the cross-over point for negatively charged regions of said target surface for the purpose of maintaining and reading out information represented by a given pattern of charge of said target surface and ($c$) which is below the cross-over point for positively charged regions of said target surface for the purpose of converting positively charged regions of said surface to negatively charged regions, and an output circuit connected to said target electrode.

4. A cathode ray tube storage system as claimed in claim 3, wherein the cathode ray tube includes two electron guns, one of which is adapted to provide a source of electrons irradiating the whole of the target continuously with electrons at an effective velocity ($b$), the other of which is associated with focussing and deflecting means and is adapted to irradiate selected regions of said target with electrons at effective electron velocities ($a$), ($b$), or ($c$) selectively.

5. A cathode ray tube storage system as claimed in claim 3, wherein the output circuit comprises current sensitive means connected to the conductive plate whereby reading-out from the system may be achieved in response to current signals in the conductive plate representative of the stored information and means are provided for reversing the polarity of the current sensitive means whereby signals read-out with the effective electron velocity ($a$) can be made consistent in polarity with signals read-out with the effective electron velocity ($b$).

6. A cathode ray tube storage system as claimed in claim 3, wherein the target electrode comprises a conductive plate carrying on one surface a discontinuous layer of insulating material in the form of a thin layer of phosphor particles in which the individual particles are separated from one another by exposed regions of said conductive plate, the exposed regions constituting substantially 50% of the target surface.

7. A cathode ray tube storage system as claimed in claim 3, wherein the target electrode comprises a conductive plate carrying on one surface a discontinuous layer of insulating material in the form of dispersed droplets of insulating material each isolated from its neighbors by an exposed region of said conductive plate, the ratio of the exposed area to the area of the insulating particles being approximately 1:1.

References Cited in the file of this patent

UNITED STATES PATENTS

| | | |
|---|---|---|
| 2,128,631 | Eaton | Aug. 30, 1938 |
| 2,193,101 | Knoll | Mar. 12, 1940 |
| 2,297,752 | Du Mont et al. | Oct. 6, 1942 |
| 2,429,933 | Gibson | Oct. 28, 1947 |
| 2,481,458 | Wertz | Sept. 6, 1949 |
| 2,518,200 | Sziklai et al. | Aug. 8, 1950 |
| 2,522,153 | Andrews | Sept. 12, 1950 |
| 2,535,817 | Skellett | Dec. 26, 1950 |
| 2,547,638 | Gardner | Apr. 3, 1951 |
| 2,548,789 | Hergenrother | Apr. 10, 1951 |
| 2,563,500 | Synder, Jr. | Aug. 7, 1951 |
| 2,635,203 | Pakswer | Apr. 14, 1953 |

OTHER REFERENCES

Haeff, "Electronics," vol. 20, September 1947, pages 80–83.